United States Patent
Liu et al.

(10) Patent No.: US 9,200,747 B2
(45) Date of Patent: Dec. 1, 2015

(54) OUTER-HANGING TOUCH APPARATUS

(71) Applicant: Quanta Computer Inc., Taoyuan Shien (TW)

(72) Inventors: Yun-Cheng Liu, New Taipei (TW); Wan-Chi Lin, Taichung (TW); Bo-Chun Hsu, Taipei (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 149 days.

(21) Appl. No.: 14/086,892

(22) Filed: Nov. 21, 2013

(65) Prior Publication Data

US 2015/0048236 A1    Feb. 19, 2015

(30) Foreign Application Priority Data

Aug. 13, 2013  (TW) .............................. 102129091 A

(51) Int. Cl.
| | |
|---|---|
| *A47F 5/08* | (2006.01) |
| *A47B 97/00* | (2006.01) |
| *F16M 11/04* | (2006.01) |
| *F16M 13/02* | (2006.01) |
| *G06F 1/16* | (2006.01) |

(52) U.S. Cl.
CPC ............ *F16M 11/043* (2013.01); *A47F 5/0876* (2013.01); *F16M 13/022* (2013.01); *G06F 1/1607* (2013.01); *A47B 2097/005* (2013.01)

(58) Field of Classification Search
CPC .. A47F 5/0876; F16M 11/043; F16M 13/022; G06F 1/1607; G06F 1/1609; A47B 2097/005
USPC .......... 248/690, 692, 490, 304, 305, 306, 339
See application file for complete search history.

(56) References Cited

U.S. PATENT DOCUMENTS

| | | | | |
|---|---|---|---|---|
| 2,985,174 | A | * | 5/1961 | Guth .............................. 24/67.1 |
| 3,029,465 | A | * | 4/1962 | Graber et al. ................. 16/94 D |
| 5,082,235 | A | * | 1/1992 | Crowther et al. ........ 248/231.41 |
| 5,432,504 | A | * | 7/1995 | Shaw et al. .............. 340/815.73 |
| 5,779,206 | A | * | 7/1998 | Harris et al. ................... 248/214 |
| 5,803,422 | A | * | 9/1998 | Buehler ........................ 248/339 |
| 6,286,803 | B1 | * | 9/2001 | Pellino et al. ................. 248/490 |
| 6,336,616 | B1 | * | 1/2002 | Lin ........................ G03B 21/58 248/222.11 |
| 7,354,023 | B1 | * | 4/2008 | Wappler ..................... 248/206.5 |

(Continued)

FOREIGN PATENT DOCUMENTS

WO    WO 2004097510 A1 * 11/2004    ............ G02F 1/1333

*Primary Examiner* — Ryan Kwiecinski
(74) *Attorney, Agent, or Firm* — Sawyer Law Group, P.C.

(57) ABSTRACT

An outer-hanging touch apparatus is hanged on a display apparatus. The display apparatus has a front surface, a top surface, and a rear surface. The outer-hanging touch apparatus includes a touch module and a hanging assembly. The hanging assembly includes a hanging member, an adjusting member, and a driving member. The hanging member is fixed to the touch module and extends to the rear surface. The hanging member includes a guiding structure. The adjusting member is slidably engaged with the guiding structure. The adjusting member abuts against a junction between the top and rear surfaces. The driving member is engaged with the hanging member and the adjusting member for moving the adjusting member relative to the hanging member. When the adjusting member moves toward or away from the touch module along the guiding structure, the hanging member correspondingly moves away from or toward the top surface.

10 Claims, 7 Drawing Sheets

(56) References Cited

U.S. PATENT DOCUMENTS

| | | | |
|---|---|---|---|
| 7,992,833 B1* | 8/2011 | Goodman et al. | 248/298.1 |
| D657,054 S * | 4/2012 | Bacon | D24/128 |
| 8,246,028 B2* | 8/2012 | Larkin et al. | 269/249 |
| D710,994 S * | 8/2014 | Yazbeck | D24/128 |
| 2002/0047079 A1* | 4/2002 | Gerson | 248/339 |
| 2002/0104937 A1* | 8/2002 | Avinger | 248/215 |
| 2004/0136150 A1* | 7/2004 | Ho | 361/681 |
| 2006/0108498 A1* | 5/2006 | Jackson | 248/690 |
| 2007/0188687 A1* | 8/2007 | She | 349/122 |
| 2012/0018599 A1* | 1/2012 | Tsai | 248/206.3 |

* cited by examiner

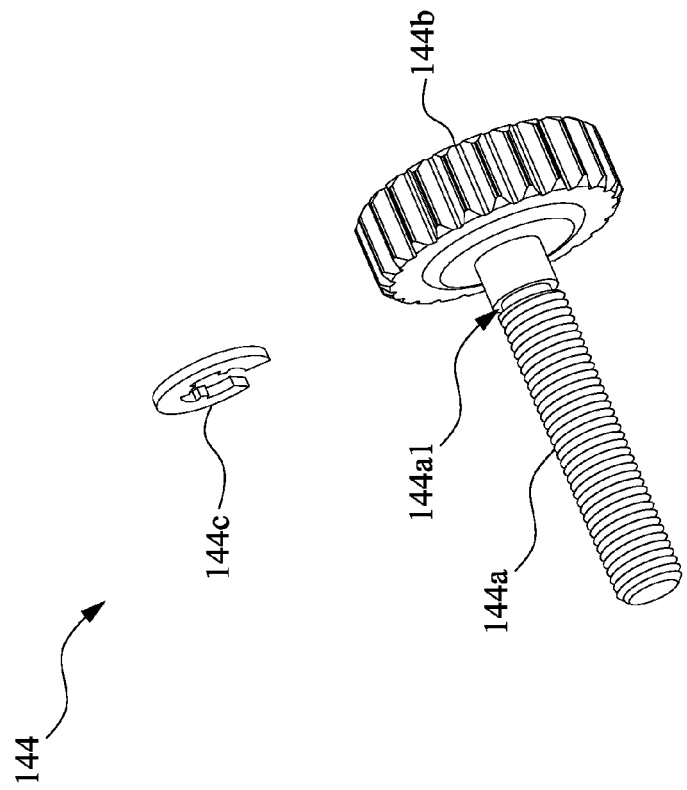
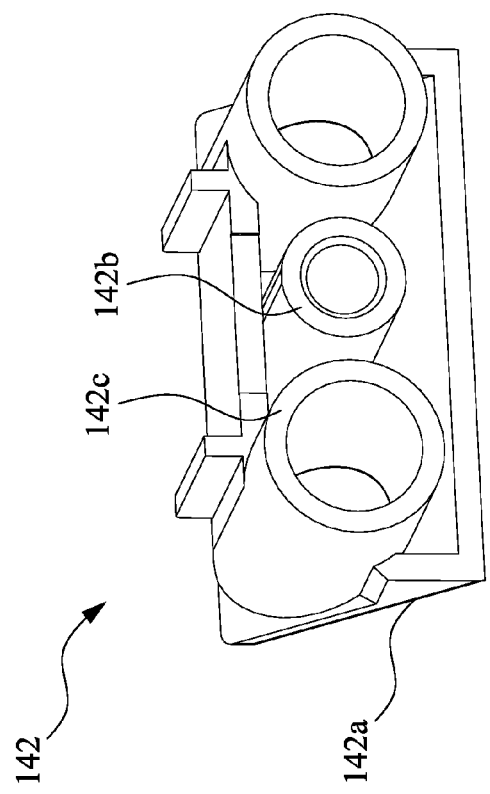
Fig. 7
Fig. 6

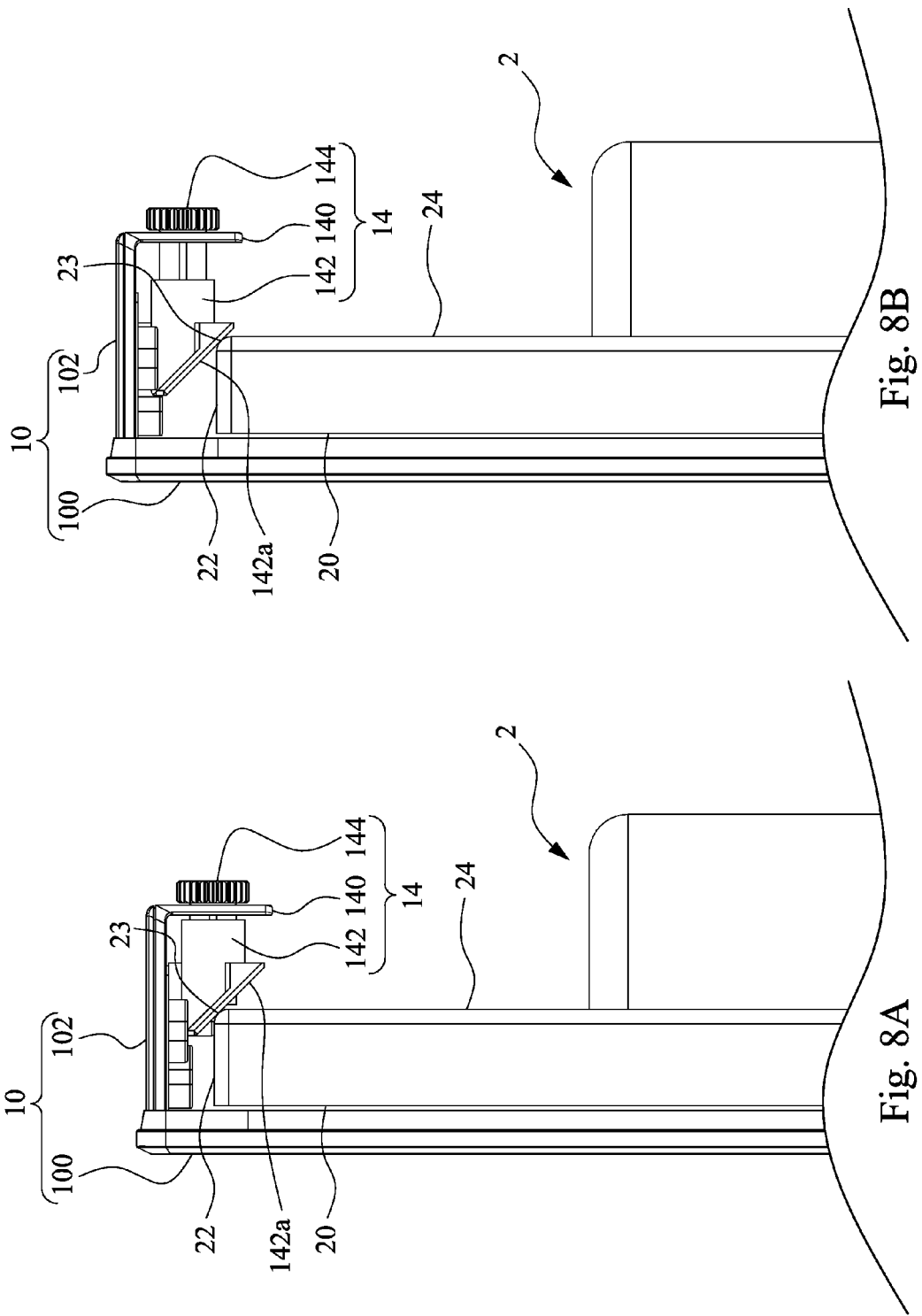

OUTER-HANGING TOUCH APPARATUS

CROSS-REFERENCE TO RELATED APPLICATIONS

This application claims priority to Taiwan Application Serial Number 102129091, filed Aug. 13, 2013, which is herein incorporated by reference.

FIELD OF THE INVENTION

The present disclosure relates to an outer-hanging touch apparatus.

BACKGROUND

With the popularity of high-tech products, consumer products (e.g., desktop computers, notebook computers, PDAs, cell phones, etc.) have been widely used, and input interfaces of these consumer products become more important. The existing input interfaces, such as traditional keyboards and mouse, touch panels that can be directly inputted, voice input devices, are widely used in various kinds of applications. Recently, the touch panel capable of directly inputting is one of the most attractive techniques for the public.

However, high-tech products equipped with the touch panels can only be seen in recent years. A huge amount of traditional desktop computers and notebook computers have only traditional displays without the benefits and funs of direct-inputting functions brought from touch panels. Also, it is unimaginably costly to replace all of the traditional displays with embedded touch displays.

Accordingly, how to provide an outer-hanging touch apparatus applicable for different LCD displays becomes an important issue to be solved.

SUMMARY

The disclosure provides an outer-hanging touch apparatus. The outer-hanging touch apparatus is hanged on a display apparatus. The display apparatus has a front surface, a top surface, and a rear surface. The top surface is connected between the front surface and the rear surface. The outer-hanging touch apparatus includes a touch module and a hanging assembly. The touch module abuts against the front surface. The hanging assembly includes a hanging member, an adjusting member, and a driving member. The hanging member is fixed to the touch module and extends to the rear surface via the top surface. The hanging member includes a guiding structure. The guiding structure faces the rear surface. The adjusting member is slidably engaged with the guiding structure, so as to move toward or away from the touch module along the guiding structure. The adjusting member has an inclined surface for abutting against a junction between the top surface and the rear surface. The driving member is engaged with the hanging member and the adjusting member, and is used to drive the adjusting member to move relative to the hanging member. When the driving member drives the adjusting member to move toward the touch module along the guiding structure, the hanging member moves away from the top surface. When the driving member drives the adjusting member to move away from the touch module along the guiding structure, the hanging member moves toward the top surface. Therefore, the vertical position of the touch module can be adjusted relative to the display apparatus.

In an embodiment of the disclosure, the hanging member includes a hanging portion and a bending portion. The hanging portion is fixed to the touch module and faces the top surface. The bending portion is connected to the hanging portion and faces the rear surface. The guiding structure is connected to the bending portion.

In an embodiment of the disclosure, the adjusting member has a nut. The driving member is pivotally connected to the bending portion and includes a stud. The stud is meshed with the nut. When the driving member rotates relative to the bending portion, the stud moves together with the adjusting member, so as to drive the adjusting member to move toward or away from the touch module.

In an embodiment of the disclosure, the bending portion has a through hole. The stud passes through the through hole. The driving member further includes a head portion and a stopping portion. The head portion is connected to an end of the stud and located at a side of the bending portion that faces away from the adjusting member. The stopping portion is disposed on the stud and located at a side of the bending portion that faces the adjusting member. The bending portion is retained between the head portion and the stopping portion.

In an embodiment of the disclosure, the stud has a groove. The stopping portion is an E-ring. The E-ring is detachably engaged in the groove.

In an embodiment of the disclosure, the connected hanging portion and the bending portion form a L-shaped appearance.

In an embodiment of the disclosure, the adjusting member includes a sleeve. The guiding structure is a guiding rod inserting into the sleeve, so as to guide the adjusting member to move.

In an embodiment of the disclosure, the guiding rod is a cruciform slider.

In an embodiment of the disclosure, the guiding structure is a sleeve. The adjusting member includes a guiding rod inserting into the sleeve, so as to move by the guidance of the sleeve.

In an embodiment of the disclosure, the outer-hanging touch apparatus further includes a fixing frame. The fixing frame includes a frame body and a fixing portion. The frame body is used to carry the touch module. The fixing portion is connected to the frame body and fixed to the hanging member.

Accordingly, the outer-hanging touch apparatus of the disclosure is capable of driving the adjusting member of the hanging assembly to move forward or away from the touch module by using the driving member. Hence, after adequately adjusted, display apparatuses with different widths can be clamped between the touch module and the inclined surface of the adjusting member. Furthermore, when the driving member drives the adjusting member to move toward or away from the touch module, the hanging member correspondingly moves away from or toward the top surface of the display apparatus, so as to achieve the purpose of adjusting the vertical position of the touch module relative to the display apparatus. Moreover, during assembly, because the components included in the outer-hanging touch apparatus are small in number and structurally simple, the installation and removal procedures are easy, and the appearance design is much more flexible.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 6 is a perspective view of an adjusting member of the hanging assembly in FIG. 3;

FIG. 7 is an exploded view of a driving member of the hanging assembly in FIG. 3;

FIG. 8A is a side view of FIG. 2; and

FIG. 8B is another side view of FIG. 2.

DETAILED DESCRIPTION

Figure 1:
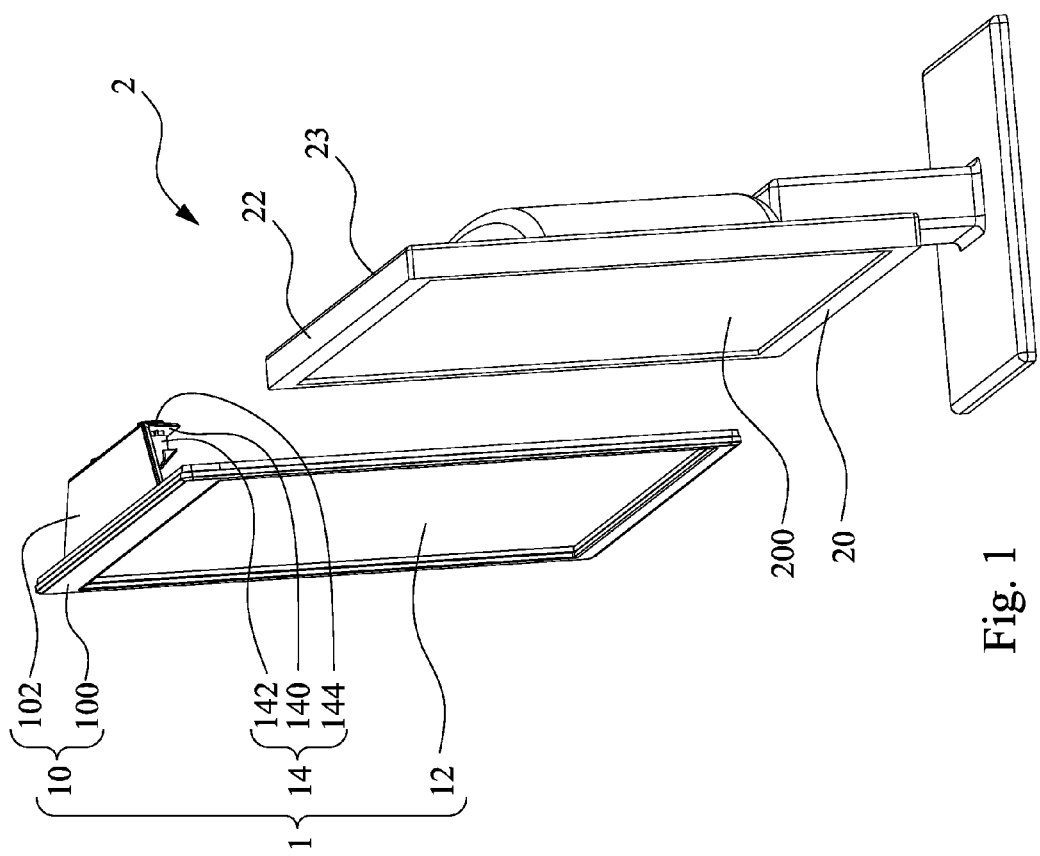
FIG. 1 is an exploded view of an outer-hanging touch apparatus and a display apparatus according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
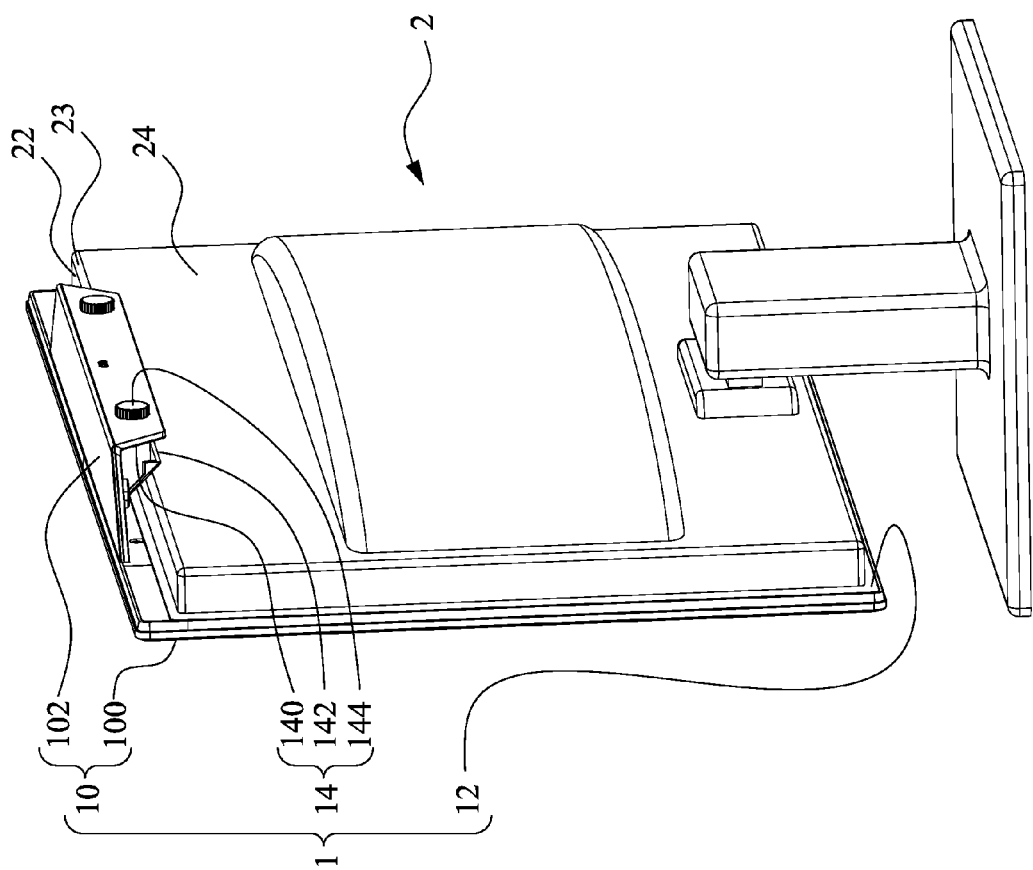
FIG. 2 is a combination view of the outer-hanging touch apparatus and the display apparatus in FIG. 1.
Figure 3:
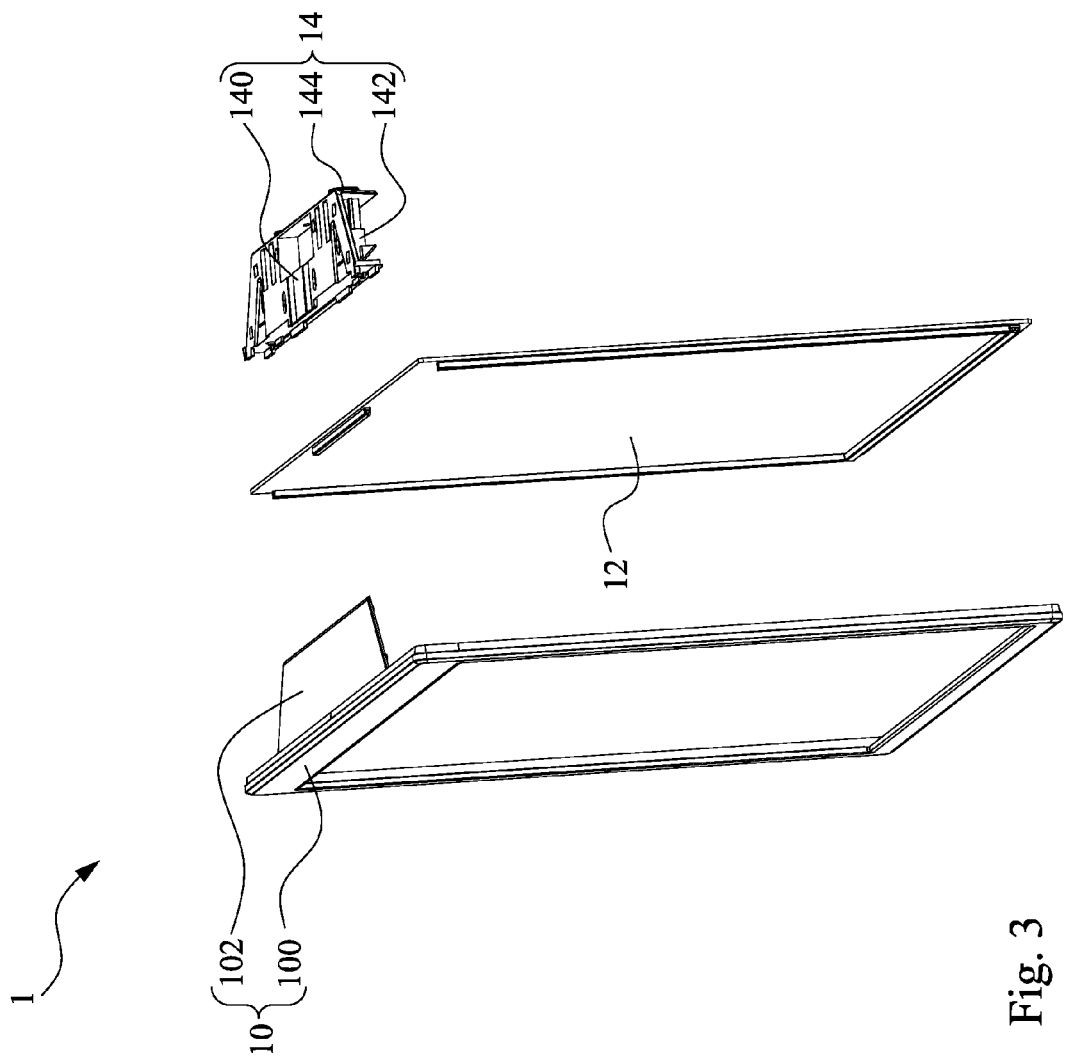
FIG. 3 is an exploded view of the outer-hanging touch apparatus in FIG. 1.

FIG. 1 is an exploded view of an outer-hanging touch apparatus 1 and a display apparatus 2 according to an embodiment of the disclosure. FIG. 2 is a combination view of the outer-hanging touch apparatus 1 and the display apparatus 2 in FIG. 1. FIG. 3 is an exploded view of the outer-hanging touch apparatus 1 in FIG. 1.

As shown in FIG. 1 to FIG. 3, the outer-hanging touch apparatus 1 can be hanged on the display apparatus 2. The display apparatus 2 has a front surface 20, a top surface 22, and a rear surface 24. The front surface 20 of the display apparatus 2 has an active area 200. The top surface 22 of the display apparatus 2 is connected between the front surface 20 and the rear surface 24. The outer-hanging touch apparatus 1 includes a fixing frame 10, a touch module 12, and a hanging assembly 14. The outer-hanging touch apparatus 1 is hanged on the top surface 22 of the display apparatus 2 with the hanging assembly 14, so as to make the center of the touch module 12 be aligned with the center of the active area 200. The structures of the fixing frame 10, the touch module 12, and the hanging assembly 14 and the connection relationships among them are described in detail below.

As shown in FIG. 3, the fixing frame 10 of the outer-hanging touch apparatus 1 includes a frame body 100 and a fixing portion 102. The frame body 100 of the fixing frame 10 is engaged with the touch module 12, so as to carry the touch module 12. The fixing portion 102 of the fixing frame 10 is connected to the frame body 100, so as to be fixed to the hanging member 14. The appearance of the fixing frame 10 is substantially L-shaped in the side view. When the outer-hanging touch apparatus 1 is hanged on the display apparatus 2 by with hanging assembly 14, the touch module 12 directly abuts against the front surface 20 of the display apparatus 2.

Figure 4:
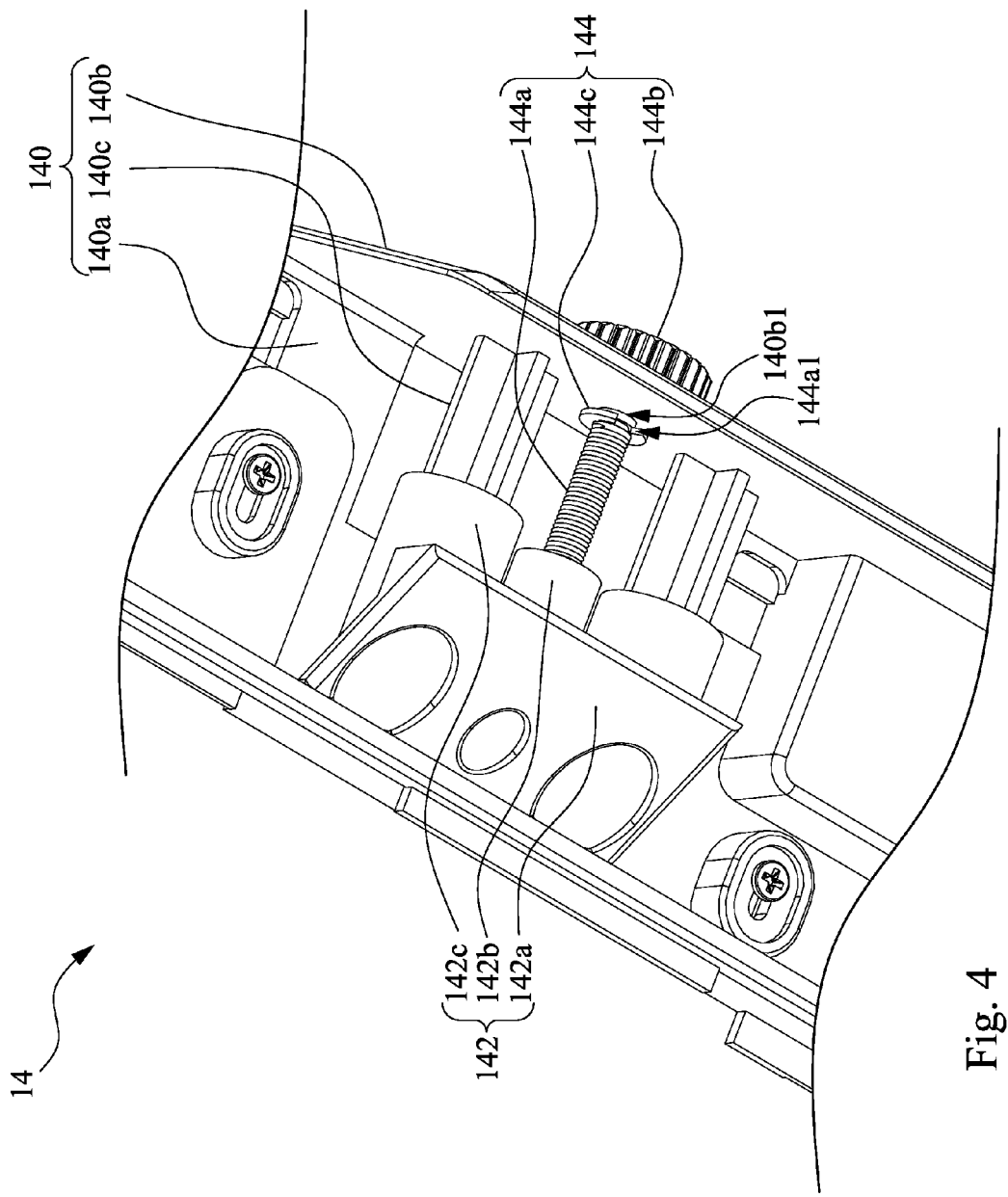
FIG. 4 is a partial enlarged view of the hanging assembly in FIG. 3.
Figure 5:
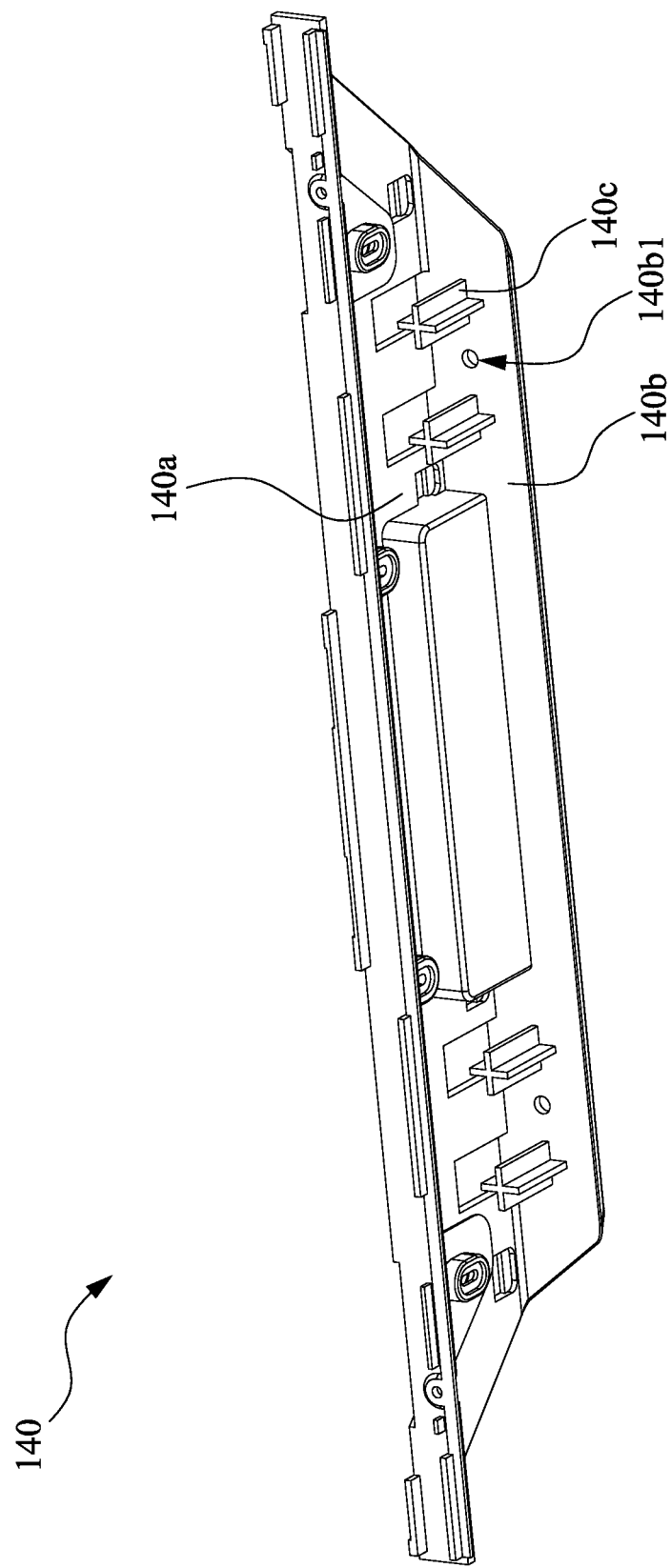
FIG. 5 is a perspective view of a hanging member of the hanging assembly in FIG. 3.

FIG. 4 is a partial enlarged view of the hanging assembly 14 in FIG. 3. FIG. 5 is a perspective view of a hanging member 140 of the hanging assembly 14 in FIG. 3. FIG. 6 is a perspective view of an adjusting member 142 of the hanging assembly 14 in FIG. 3. FIG. 7 is an exploded view of a driving member 144 of the hanging assembly 14 in FIG. 3. The structures of the components included in the hanging assembly 14 and the connection relationships among them are described in detail below.

As shown in FIG. 4 and FIG. 5 with reference to FIG. 1 to FIG. 3, the hanging assembly 14 includes the hanging member 140, the adjusting member 142, and the driving member 144. The hanging member 140 of the hanging assembly 14 is fixed to the touch module 12 (by fixed to the fixing portion 102 of the fixing frame 10) and extends to the rear surface 24 via the top surface 22 of the display apparatus 2 (as shown in FIG. 8A). The hanging member 140 includes a guiding structure 140c. The extending direction of the guiding structure 140c faces the rear surface 24 of the display apparatus 2. The adjusting member 142 of the hanging assembly 14 is slidably engaged with the guiding structure 140c of the hanging member 140, so as to move toward or away from the touch module 12 along the extending direction of the guiding structure 140c. The adjusting member 142 has an inclined surface 142a for abutting against a junction 23 between the top surface 22 and the rear surface 24 of the display apparatus 2. The driving member 144 of the hanging assembly 14 is engaged with the hanging member 140 and the adjusting member 142, and is used to drive the adjusting member 142 to move relative to the hanging member 140.

Furthermore, the hanging member 140 of the hanging assembly 14 includes a hanging portion 140a and a bending portion 140b. The hanging portion 140a is fixed to the touch module 12 (by fixed to the fixing portion 102 of the fixing frame 10) and faces the top surface 22 of the display apparatus 2. The bending portion 140b is connected to the hanging portion 140a and faces the rear surface 24 of the display apparatus 2. The guiding structure 140c is connected to the bending portion 140b. In the embodiment of the disclosure, the connected hanging portion 140a and the bending portion 140b form a L-shaped appearance, but the disclosure is not limited in this regard.

As shown in FIG. 6 and FIG. 7 with reference to FIG. 4 and FIG. 5, the adjusting member 142 of the hanging assembly 14 includes a sleeve 142c. The guiding structure 140c of the hanging member 140 is a guiding rod inserting into the sleeve 142c, so as to guide the adjusting member 142 to move. In the embodiment of the disclosure, the guiding rod is a cruciform slider, but the disclosure is not limited in this regard.

In practice, the sleeve 142c of the adjusting member 142 and the guiding structure 140c of the hanging member 140 can be replaced with each other (i.e., by disposing the sleeve 142c on the bending portion 140b of the hanging member 140, and disposing the guiding structure 140c on the adjusting member 142) and similarly achieve the function of guiding the adjusting member 142 to move relative the hanging member 140.

As shown in FIG. 6 and FIG. 7 with reference to FIG. 4 and FIG. 5, the adjusting member 142 of the hanging assembly 14 has a nut 142b. The driving member 144 of the hanging assembly 14 is pivotally connected to the bending portion 140b of the hanging member 140 and includes a stud 144a. The stud 144a is meshed with the nut 142b.

Furthermore, as shown in FIG. 4, the bending portion 140b of the hanging member 140 has a through hole 140b1 (as shown in FIG. 5), so as to be passed through by the stud 144a of the driving member 144. The driving member 144 further includes a head portion 144b and a stopping portion 144c. The head portion 144b of the driving member 144 is connected to an end of the stud 144a (as shown in FIG. 7), and is located at a side of the bending portion 140b that faces away from the adjusting member 142. The stopping portion 144c of the driving member 144 is disposed on the stud 144a, and is located at a side of the bending portion 140b that faces the adjusting member 142. The sizes (e.g., widths) of the head portion 144b and the stopping portion 144c are larger than the size of the through hole 140b1, so the bending portion 140b is retained between the head portion 144b and the stopping portion 144c. In the embodiment of the disclosure, the distance between the head portion 144b and the stopping portion 144c is slightly larger than the thickness of the bending portion 140b (i.e., slight tolerances), so that the driving member 144 can only rotate relative to the bending portion 140b, rather than moving relative to the bending portion 140b.

It should be pointed out that after the driving member 144 is pivotally connected to the bending portion 140b, the alignment (i.e., the axis) of the stud 144a of the driving member 144 is parallel to the alignment (i.e., the extending direction) of the guiding structure 140c, and the alignment (i.e., the forming direction of the inner space) of the sleeve 142c of the adjusting member 142 is parallel to the alignment (i.e., the forming direction of the inner space) of the nut 142b. Hence, when the driving member 144 rotates relative to the bending portion 140b of the hanging member 140, the stud 144a of the driving member 144 moves together with the adjusting member 142 (by pressing the internal thread of the nut 142b with the external thread of the stud 144a), so as to make adjusting member 142 move toward or away from the touch module 12 along the guiding structure 140c (with reference to FIG. 2).

In the embodiment of the disclosure, as shown in FIG. 7, the stud 144a of the driving member 144 has a groove 144a1. The stopping portion 144c of the driving member 144 is an E-ring. The E-ring is detachably engaged in the groove 144a1. However, the way by which the stopping portion 144c is disposed on the stud 144a is not limited in this regard.

Furthermore, as shown in FIG. 7, the stud 144a and the head portion 144b of the driving member 144 can be obtained by forming the groove 144a1 on a screw that is already exist used in the market, but the disclosure is not limited in this regard.

FIG. 8A is a side view of FIG. 2. FIG. 8B is another side view of FIG. 2.

Under the configurations of the foregoing outer-hanging touch apparatus 1, when the vertical position of the center of the touch module 12 is lower than the vertical position of the center of the active area 200 of the display apparatus 2, a user can drive the adjusting member 142 to move toward the touch module 12 along the guiding structure 140c by using the driving member 144 of the hanging assembly 14 (by making the driving member 144 rotate relative to the bending portion 140b of the hanging member 140). At the same time, the contact position of the junction 23 of the display apparatus 2 on the inclined surface 142a moves downward corresponding to the movement of the adjusting member 142, so that the hanging member 140 moves away from the top surface 22 of the display apparatus 2, and the vertical position of the center of the touch module 12 is risen to be aligned with the vertical position of the center of the active area 200 of the display apparatus 2 (as adjusted from FIG. 8A to FIG. 8B).

On the contrary, when the vertical position of the center of the touch module 12 is higher than the vertical position of the center of the active area 200 of the display apparatus 2, a user can drive the adjusting member 142 to move away from the touch module 12 along the guiding structure 140c by using the driving member 144 of the hanging assembly 14 (by making the driving member 144 rotate relative to the bending portion 140b of the hanging member 140). At the same time, the contact position of the junction 23 of the display apparatus 2 on the inclined surface 142a moves upward corresponding to the movement of the adjusting member 142, so that the hanging member 140 moves toward the top surface 22 of the display apparatus 2, and the vertical position of the center of the touch module 12 is lowered to be aligned with the vertical position of the center of the active area 200 of the display apparatus 2 (as adjusted from FIG. 8B to FIG. 8A).

According to the foregoing recitations of the embodiments of the disclosure, it can be seen that the outer-hanging touch apparatus of the disclosure is capable of driving the adjusting member of the hanging assembly to move forward or away from the touch module by using the driving member. Hence, after adequately adjusted, display apparatuses with different widths can be clamped between the touch module and the inclined surface of the adjusting member. Furthermore, when the driving member drives the adjusting member to move toward or away from the touch module, the hanging member correspondingly moves away from or toward the top surface of the display apparatus, so as to achieve the purpose of adjusting the vertical position of the touch module relative to the display apparatus. Moreover, during assembly, because the components included in the outer-hanging touch apparatus are small in number and structurally simple, the installation and removal procedures are easy, and the appearance design is much more flexible.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An outer-hanging touch apparatus configured to be hanged on a display apparatus, the display apparatus having a front surface, a top surface, and a rear surface, the top surface connected between the front surface and the rear surface, the outer-hanging touch apparatus comprising:
   a touch module being configured to abut against the front surface; and
   a hanging assembly comprising:
      a hanging member fixed to the touch module and being configured to extend to the rear surface via the top surface, the hanging member comprising a guiding structure, the guiding structure being configured to face the rear surface;
      an adjusting member slidably engaged with the guiding structure so as to move toward or away from the touch module along the guiding structure, the adjusting member having an inclined surface for abutting against a junction between the top surface and the rear surface; and
      a driving member engaged with the hanging member and the adjusting member, for driving the adjusting member to move relative to the hanging member,
   wherein the hanging member is configured to move away from the top surface when the driving member drives the adjusting member to move toward the touch module along the guiding structure, and the hanging member is configured to move toward the top surface so as to adjust the vertical position of the touch module relative to the display apparatus when the driving member drives the adjusting member to move away from the touch module along the guiding structure.

2. The outer-hanging touch apparatus of claim 1, wherein the hanging member comprises:
   a hanging portion fixed to the touch module and being configured to face the top surface; and
   a bending portion connected to the hanging portion and being configured to face the rear surface, wherein the guiding structure is connected to the bending portion.

3. The outer-hanging touch apparatus of claim 2, wherein the adjusting member has a nut, the driving member is rotatably connected to the bending portion and comprises a stud that is meshed with the nut, and the stud is configured to move together with the adjusting member, so as to drive the adjusting member to move toward or away from the touch module when the driving member rotates relative to the bending portion.

4. The outer-hanging touch apparatus of claim 3, wherein the bending portion has a through hole, the stud is configured to pass through the through hole, and the driving member further comprises:
   a head portion connected to an end of the stud and located at a side of the bending portion that faces away from the adjusting member; and
   a stopping portion disposed on the stud and located at a side of the bending portion that faces the adjusting member, wherein the bending portion is retained between the head portion and the stopping portion.

5. The outer-hanging touch apparatus of claim 4, wherein the stud has a groove, the stopping portion is an E-ring, and the E-ring is detachably engaged in the groove.

6. The outer-hanging touch apparatus of claim 2, wherein the hanging portion and the bending portion collectively form a L-shaped appearance.

7. The outer-hanging touch apparatus of claim 1, wherein the adjusting member comprises a sleeve, and the guiding structure is a guiding rod which is configured to insert into the sleeve so as to guide the adjusting member to move.

8. The outer-hanging touch apparatus of claim 7, wherein the guiding rod is a cruciform slider.

9. The outer-hanging touch apparatus of claim 1, wherein the guiding structure is a sleeve, and the adjusting member comprises a guiding rod which is configured to insert into the sleeve so as to move by the guidance of the sleeve.

10. The outer-hanging touch apparatus of claim 1, further comprising a fixing frame, the fixing frame comprising:
   a frame body for carrying the touch module; and
   a fixing portion connected to the frame body and fixed to the hanging member.

* * * * *